United States Patent [19]

Seron

[11] 3,772,740

[45] Nov. 20, 1973

[54] LANYARD CONSTRUCTION

[75] Inventor: Suren M. Seron, Joliet, Ill.

[73] Assignee: Seron Mfg. Co., Joliet, Ill.

[22] Filed: Jan. 24, 1972

[21] Appl. No.: 220,117

[52] U.S. Cl. .................................. 24/73 R, 224/5
[51] Int. Cl. ........................................... A44b 21/00
[58] Field of Search .................. 24/84 C, 3 A, 3 B,
  24/3 C, 73 A, 73 ES, 73 FA, 73 R, 73 C,
  265 CC, 265 SH, 261 G, 205, 15 H, 261 R,
  261 B, 24/260, 261 FC, 261 SP, 261; 224/4 A,
  4 B, 5 J, 5 H, 5 R, 56–58

[56] References Cited
UNITED STATES PATENTS

| 255,620 | 3/1882 | Hale | 24/260 X |
| 337,311 | 3/1886 | Davis | 24/261 B X |
| 590,401 | 9/1897 | Morgan | 24/260 |
| 2,279,934 | 4/1942 | Wisecup | 24/261 B UX |
| 2,552,415 | 5/1951 | Fachon | 24/265 CC |
| 2,947,456 | 8/1960 | Seron | 224/5 |
| 3,176,367 | 4/1965 | Risse | 24/260 |

FOREIGN PATENTS OR APPLICATIONS

| 680,227 | 10/1952 | Great Britain | 24/265 CC |

Primary Examiner—Donald A. Griffin
Attorney—Axel A. Hofgren et al.

[57] ABSTRACT

A clip for use in fabricating lanyards for holding whistles, stopwatches or the like. The clip is defined by a Y-shaped element preferably formed of resilient wire. The base of the Y has a portion configured in the shape of a hook to engage the stopwatch or whistle while the legs of the Y have inwardly directed ends which are adapted to be piercingly received in the walls of respective ends of resilient tubing such as plastic or the like.

9 Claims, 7 Drawing Figures

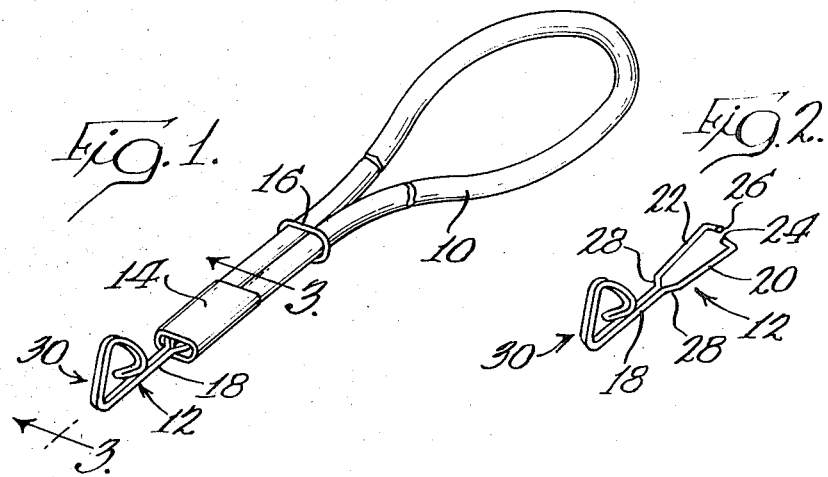
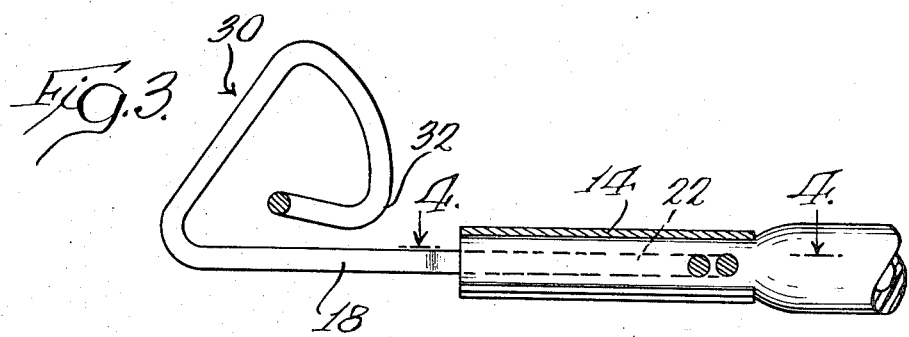
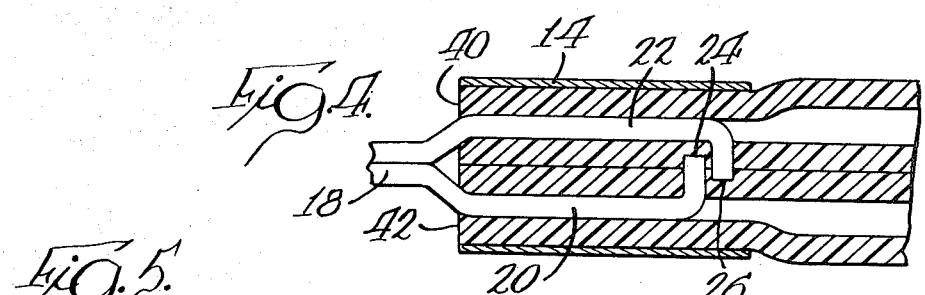
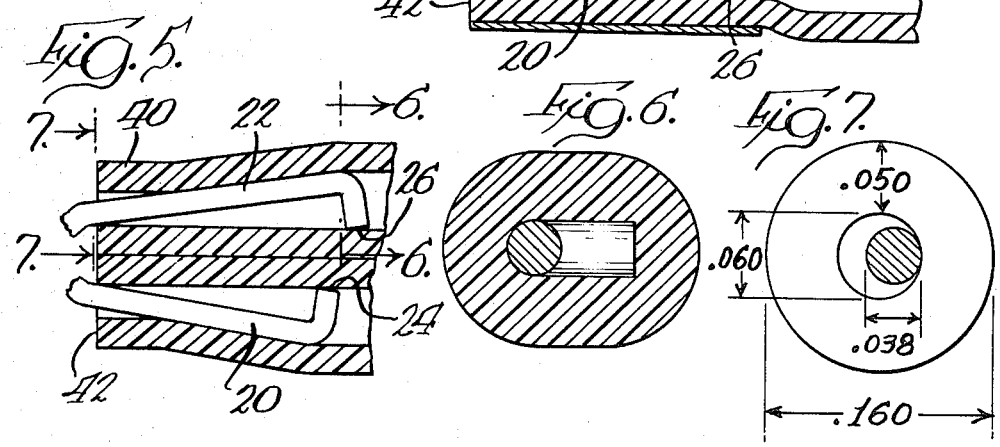

3,772,740

LANYARD CONSTRUCTION

BACKGROUND OF THE INVENTION

This invention relates to lanyard constructions, and more particularly, to clips used in lanyard constructions.

For many years, lanyards of one type or another have seen extensive use in a variety of fields. Perhaps the most frequent use of lanyards is encountered in the field of athletics where they are employed to hold whistles, stopwatches, etc. in a relatively convenient position on the user of the instrumentality. Most lanyard constructions heretofore known are relatively expensive and/or difficult to fabricate depending upon the technique used. Thus, there is a real need for an inexpensively fabricated lanyard of high quality and pleasing appearance which can be manufactured inexpensively.

SUMMARY OF THE INVENTION

It is the principal object of the invention to provide a new and improved lanyard assembly. More specifically, it is an object of the invention to provide a new and improved clip for use in fabricating a lanyard assembly as well as a lanyard assembly employing such a clip.

The exemplary embodiment of the invention achieves the foregoing objects by means of a clip formed of a length of resilient wire such as stainless steel. The central portion of the wire is bent upon itself to define the base of a Y-shaped element. A portion of the base is provided with a retaining configuration, preferably in the form of a hook having a redirected portion terminating closely adjacent the plane defined by the Y-shaped element. The legs of the Y-shaped elements have inwardly directed ends and those portions of the legs adjacent the ends are arranged in a generally parallel configuration. Those portions of the legs adjacent to the base are made outwardly diverging. The legs of the Y-shaped element are adapted to be received within flexible tubing formed out of materials softer than that of the clip, preferably plastic, in such a way that the inturned ends pierce the tubing walls to firmly grip the same and hold the clip in place. If desired, a ferrule may surround the end of the plastic tubing for an even more positive retaining action.

According to the most advantageous form of the invention, the sum of the length of the inturned ends of the legs is greater than the spacing between the legs so that the inturned ends not only pierce the wall of the respective tubing ends in which they are received, but a portion of the other tubing ends as well.

Other objects and advantages will become apparent from the following specification taken in conjunction with the accompanying drawings.

DESCRIPTION OF THE DRAWINGS

FIG. 1 is a perspective view of a lanyard made according to the invention;

FIG. 2 is a perspective view of a clip made according to the invention employed in fabricating the lanyard;

FIG. 3 is a vertical section taken approximately along the line 3—3 of FIG. 1;

FIG. 4 is a horizontal section taken approximately along the line 4—4 of FIG. 3;

FIG. 5 is an enlarged, fragmentary sectional view illustrating the ends of the clip received within ends of plastic tubing prior to completion of assembly;

FIG. 6 is a sectional view taken approximately along the line 6—6 of FIG. 5; and FIG. 7 is a sectional view taken approximately along the line 7—7 of FIG. 5 and additionally showing preferred dimensions of the various elements.

DESCRIPTION OF THE PREFERRED EMBODIMENT

An exemplary embodiment of a lanyard made according to the invention is illustrated in FIG. 1 and is seen to include four basic components. The first is a loop 10 of plastic tubing or the like. Depending upon how the lanyard is to be utilized by the wearer, the loop of tubing 10 can be a variety of lengths. For example, long lengths will be employed if the lanyard is to be worn around the neck, while significantly shorter lengths may be employed if the lanyard is to be worn about the wrist. Extremely short lengths may be used if the lanyard is to be worn about the finger or the like.

A second component of the lanyard is an attaching clip, generally designated 12, which is secured by means to be described in greater detail hereinafter to the ends to the plastic tubing 10.

A third element comprises a crimped ferrule 14 which surrounds the ends of the plastic tubing to hold the lanyard in assembled relation while a fourth element comprises a slidable wire loop 16 which can be moved along the length of the tubing 10 to increase or diminish the size of the loop defined thereby.

With reference now to FIG. 2, the clip 12 is seen to be generally Y-shaped in configuration and includes a base 18 and a pair of legs 20 and 22. The ends 24 and 26 of the legs 20 and 22 are inwardly directed and are offset one from the other by reason of the leg 20 having a shorter length than the leg 22. In general, portions of the legs 20 and 22 adjacent the ends 24 and 26 are parallel as illustrated in FIG. 2, while portions of the legs 20 and 22 adjacent the connection to the base 18 are defined by outwardly diverging portions 28. The presence of the outwardly diverging portions 28 provides for spacing of the parallel portions of the legs 20 and 22.

In general, the length of the inturned ends 24 and 26 will be approximately equal, with due allowances for tolerances and inexpensive manufacturing procedures, and the sum of their lengths is chosen to be greater than the spacing between the parallel portions of the legs 20 and 22 for purposes to be seen.

Finally, the base 18 of the clip 12 is provided with retaining means, generally designated 30, for retaining a whistle or stopwatch or the like. According to the preferred form of the invention, the retaining means is configured in the form of a hook and as best illustrated in FIG. 3, includes a redirected portion 32 closely adjacent the remainder of the base. That is, the redirected portion 32 is closely adjacent a plane defined by the remainder of the Y-shaped clip 12. As a result, an eyelet on a whistle or stopwatch or the like, which generally will have a greater thickness than the distance between the base 18 and the Y-shaped element and the redirected portion 32, may be forced between the two to be received within the remainder of the hook structure defining the retaining means 30.

Preferably, the Y-shaped element is formed of a wire, which in turn is formed of a resilient material. For example, stainless steel wire is ideal for the purpose not only by reason of its strength, but for the reason that the same will not be corroded by oils of the skin of the user of the lanyard so that the same will have a pleasing appearance throughout its useful life. Of course, when a wire is employed to fabricate the clip 12, the base 18, and thus the retaining means 30, will be formed of the central portion of the length of the wire employed.

With reference now to FIGS. 3-7 inclusive, the manner in which the clip 12 is employed in fabricating a lanyard will be described in greater detail. Referring specifically to FIG. 5, one end 40 of the length of plastic tubing 10 receives the leg 22 of the clip while the opposite end 42 of the length of tubing 10 receives the leg 20. Because the plastic used is a relatively soft material and most certainly is softer than the material used in forming the Y-shaped clip 12, the plastic will yield as illustrated to allow the insertion shown, and when the legs 20 and 22 are fully inserted in the respective ends of the plastic tubing, they may be forced together to assume a configuration generally as shown in FIG. 4. In particular, the end 24 of the leg 20 has completely pierced the end 42 of the tubing 10 and partially pierced the end 40 of the plastic tubing as well. By the same token, the end 26 of the leg 22 has completely pierced the end 40 of the plastic tubing and partially pierced the end 42 thereof. As a result, there is some overlap between the ends 24 and 26 of the legs 20 and 22, but it will be recalled that the leg 20 is shorter than the leg 22 so that no interference results. Thereafter, the ferrule 14 may be applied and crimped as illustrated in both FIGS. 3 and 4. As a result, the clip 12 will be firmly secured to the ends 40 and 42 of the plastic tubing by reason of the piercing action of the ends 24 and 26 of the legs 20 and 22 as illustrated.

FIG. 7 also illustrates, in thousandths of an inch, one set of relative dimensions of the various components that has proved to be particularly successful.

From the foregoing, it will be appreciated that a lanyard made according to the invention is extremely simple to fabricate and can be done so with low cost parts and without time consuming labor.

I claim:

1. A lanyard comprising: a wire formed of a generally resilient material having its center formed to define a hook, its ends directed toward each other and intermediate portions of unequal length extending from said center to respective ones of said ends whereby said ends are offset from each other; an elongated, flexible tube having open ends receiving respective ends of said wire; and means for holding said wire and said tube in assembled relation.

2. A lanyard according to claim 1 wherein said intermediate portions are generally parallel.

3. A lanyard comprising: a wire formed of a generally resilient material having its center formed to define retaining means, its ends directed towards each other and intermediate portions of unequal length extending from said center to respective ones of said ends whereby said ends are offset from each other; an elongated tube of flexible material, said flexible material being softer than said generally resilient material whereby the latter may pierce the former; respective ends of said wire being received in respective ends of said tube and each extending at least partially through the side wall of the tubing end in which it is received, and a ferrule surrounding said tubing ends.

4. The lanyard of claim 3 wherein each said end extends fully through the tubing end in which it is received and at least partially pierces the other tubing end.

5. A clip for use in fabricating a lanyard comprising: a wire formed of a generally resilient material having its center formed to define a hook, its ends directed towards each other and intermediate portions of unequal length extending from said center to respective ones of said ends whereby said ends are offset from each other, said intermediate portions further being generally parallel, parts of said intermediate portions adjacent said center being in substantial abutment and other parts of said intermediate portions adjacent said ends being spaced.

6. A clip according to claim 5 wherein said ends are approximately equal in length and the sum of their lengths is greater than the space between said other parts.

7. A clip for use in fabricating a lanyard comprising: a generally Y-shaped element formed of generally resilient material, at least a portion of the base of the Y-shaped element being configured to define a hook and the upper ends of the legs of the Y-shaped element being inwardly directed toward each other, said Y-shaped element being formed of a length of wire and said base comprising the central portion of the length of wire doubled upon itself.

8. A clip for use in fabricating a lanyard, comprising: a generally Y-shaped element formed of a generally resilient material, at least a portion of the base of the Y-shaped element being configured to define retaining means in the upper ends of the legs of the Y-shaped element being inwardly directed towards each other, said Y-shaped element being formed of a length of wire and said base comprising the central portion of the length of wire doubled upon itself, the legs of said Y-shaped element including outwardly diverging portions adjacent said base and generally parallel portions adjacent said ends, one of said legs having a longer length than the other.

9. A clip according to claim 8 wherein said retaining means comprises a hook extending generally transverse to a plane defined by the remainder of said Y-shaped element, said hook including a redirected portion closely adjacent said plane.

* * * * *